United States Patent
Op't Roodt et al.

(10) Patent No.: US 8,448,290 B2
(45) Date of Patent: May 28, 2013

(54) DEVICE FOR THE JOINTED CONNECTION OF A WIPER BLADE

(75) Inventors: Inigo Op't Roodt, Hasselt (BE); Peter De Block, Halen (BE); Hans Beelen, Herk de Stad (BE); Eric Windmolders, Kermt (BE)

(73) Assignee: Robert Bosch GmbH, Suttgart (DE)

( * ) Notice: Subject to any disclaimer, the term of this patent is extended or adjusted under 35 U.S.C. 154(b) by 249 days.

(21) Appl. No.: 12/867,284

(22) PCT Filed: Feb. 18, 2009

(86) PCT No.: PCT/EP2009/051885
§ 371 (c)(1),
(2), (4) Date: Aug. 12, 2010

(87) PCT Pub. No.: WO2009/112330
PCT Pub. Date: Sep. 17, 2009

(65) Prior Publication Data
US 2010/0306949 A1    Dec. 9, 2010

(30) Foreign Application Priority Data
Mar. 12, 2008    (DE) .......................... 10 2008 000 626

(51) Int. Cl.
*B60S 1/40*    (2006.01)
(52) U.S. Cl.
USPC ................. 15/250.32; 15/250.351; 15/250.43
(58) Field of Classification Search
USPC ........... 15/250.201, 250.31, 250.351, 250.43, 15/250.32
IPC ................................................ B60S 1/38,1/40
See application file for complete search history.

(56) References Cited

U.S. PATENT DOCUMENTS

| | | | | |
|---|---|---|---|---|
| 3,576,044 A | * | 4/1971 | Besnard | 15/250.32 |
| 4,343,062 A | * | 8/1982 | van den Berg | 15/250.32 |
| 4,445,249 A | * | 5/1984 | Harbison et al. | 15/250.32 |

(Continued)

FOREIGN PATENT DOCUMENTS

| | | |
|---|---|---|
| DE | 10130903 | 5/2002 |
| DE | 10130903 A1 * | 5/2002 |
| WO | 03/084789 | 10/2003 |

OTHER PUBLICATIONS

PCT/EP2009/051885 International Search Report.

*Primary Examiner* — Joseph J Hail
*Assistant Examiner* — Marc Carlson
(74) *Attorney, Agent, or Firm* — Michael Best & Friedrich LLP

(57) ABSTRACT

The invention relates to a device (10) for the jointed connection of a wiper blade (12), having a wiper arm (18), wherein a connector (20) intended to be connected to the wiper blade (12) has a joint part (32) which forms a joint with a joint part (40) on a connector (38) intended to be connected to the wiper arm, and one of the joint parts (40) is a hub (40) open in the longitudinal direction of the associated component (20 or 28), the hub being supported with respect to the other component (38) in the direction opposite (42) the hub opening (42) when in the installed state, wherein the side walls (30, 56) of the connector (20) and of the connector (38) overlap. It is suggested that the side walls (56) of one component (38) has recesses (44) which are open to the wiper strip (14), and plunge into the projections (34) in the wiper blade (12) operating position, such that both components (20, 38) are locked against each other in the longitudinal direction.

15 Claims, 2 Drawing Sheets

U.S. PATENT DOCUMENTS

| | | | | |
|---|---|---|---|---|
| 5,807,016 A * | 9/1998 | Herring et al. | | 403/321 |
| 6,530,111 B1 * | 3/2003 | Kotlarski | | 15/250.32 |
| 6,643,889 B1 * | 11/2003 | Kotlarski | | 15/250.32 |
| 7,055,207 B2 * | 6/2006 | Coughlin | | 15/250.32 |
| 7,159,267 B2 * | 1/2007 | Son, II | | 15/250.201 |
| 7,607,194 B2 * | 10/2009 | Weber et al. | | 15/250.32 |
| 7,941,891 B2 * | 5/2011 | Breesch | | 15/250.201 |
| 2003/0182753 A1 * | 10/2003 | Baseotto et al. | | 15/250.32 |
| 2004/0211021 A1 * | 10/2004 | Weber et al. | | 15/250.32 |
| 2005/0028312 A1 * | 2/2005 | Coughlin | | 15/250.32 |
| 2006/0059647 A1 * | 3/2006 | Ostrowski | | 15/250.32 |
| 2006/0064842 A1 * | 3/2006 | Verelst et al. | | 15/256.5 |
| 2006/0117515 A1 * | 6/2006 | Fink et al. | | 15/250.32 |
| 2007/0289079 A1 * | 12/2007 | Van Bealen | | 15/250.32 |
| 2008/0163448 A1 * | 7/2008 | Yang et al. | | 15/250.352 |
| 2008/0235896 A1 * | 10/2008 | Cheng | | 15/250.201 |
| 2008/0313841 A1 * | 12/2008 | De Block et al. | | 15/250.32 |
| 2009/0064438 A1 * | 3/2009 | Boland et al. | | 15/250.32 |
| 2009/0113653 A1 * | 5/2009 | Thienard | | 15/250.32 |
| 2009/0188069 A1 * | 7/2009 | Crabbe et al. | | 15/250.32 |
| 2009/0199357 A1 * | 8/2009 | Thienard | | 15/250.32 |
| 2009/0282637 A1 * | 11/2009 | Weber et al. | | 15/250.32 |
| 2009/0307862 A1 * | 12/2009 | Boland | | 15/250.32 |
| 2010/0154158 A1 * | 6/2010 | Boland | | 15/250.32 |
| 2010/0154159 A1 * | 6/2010 | Baque | | 15/250.32 |
| 2010/0212101 A1 * | 8/2010 | Thienard et al. | | 15/250.32 |
| 2011/0072607 A1 * | 3/2011 | Van Baelen et al. | | 15/250.32 |

* cited by examiner

DEVICE FOR THE JOINTED CONNECTION OF A WIPER BLADE

BACKGROUND OF THE INVENTION

The invention is based on a device for the jointed connection of a wiper blade.

DE 199 14 413 A1 discloses a wiper, the wiper arm of which is coupled releasably at the free end thereof to a joint-free wiper blade of flat-bar construction via a joining device. The joining device has a joining element which is fastened on a supporting element of the wiper blade and, on its front side, has a joint pin in the form of two laterally arranged journals. At the end thereof opposite the joint pin, the joining element has bearing surfaces which face the joint pin and form a counterbearing with bearing surfaces on a connecting part. The connecting element, on the front side thereof, has an open hub which is provided in lateral guide walls and in which the journals of the joining element are mounted in the fitted state. The connecting element is fastened to a wiper arm laterally with respect to the open hub. In this case, the open hub faces offset parallel to the wiper arm in the direction of the free end thereof such that the joining element, which is fastened to the wiper blade, can be pushed between the lateral guide walls of the connecting element parallel to the wiper arm until the lateral journals come to bear against the bearing surfaces of the open hub. During the installation, the bearing surfaces which belong to the counterbearing and are arranged in a laterally flexible manner on flexible tongues of the joining element are pressed inward and are reset elastically again outward into the old position as soon as they have passed the corresponding bearing surfaces on the second joining part. Therefore, in the event of shallow angles between the wiper blade and the wiper arm, as are provided in the operating position of the wiper blade, the joint is fixed in the longitudinal direction of the wiper blade by the counterbearing.

SUMMARY OF THE INVENTION

According to the invention, the side walls of the one component, namely the joining element or the connecting element, have cutouts which are open toward the wiper strip and into which projections enter in the operating position of the wiper blade such that, in this position, the two components are locked against each other in the longitudinal direction. This gives rise, using simple means, to a flat and operationally reliable jointed connection between the wiper arm and the wiper blade, in particular if, according to a refinement of the invention, the joining element is designed as a sheet-metal claw, and the projections are formed by tabs which are cut free from the side parts of the joining element and are bent toward a connecting element such that said tabs can enter into the cutouts therein or into the adjoining, lateral pockets of the wiper arm. In principle, however, the projections may also be produced by injection molding if the joining elements are made of plastic, or may be manufactured as a bead or the like in the case of a sheet-metal forming technique. Furthermore, it is advantageous that the side walls of the joining element as one joint part bear a joint pin which is arranged between the outer end of the joining element and the tabs. The short distance between the pin and the tabs in the longitudinal direction enables the locking of the open hub to be effective in the operating position over a shallow angle between the wiper blade and the wiper arm, said angle being greater in comparison to a solution in which the locking is provided at a greater distance from the joint pin, for example at the drive end of the joining element, given an identical height.

So that, in the case of such a flat construction, the open hub has sufficient free movement in the region of the pivot, it is advantageous to provide a cutout in the base of the joining element in the region of the joint pin, said cutout ensuring sufficient free movement for the outermost contour of the open hub.

BRIEF DESCRIPTION OF THE DRAWINGS

Further advantages emerge from the description below of the drawing. The drawing illustrates an exemplary embodiment of the invention. The drawing, the description and the claims contain numerous features in combination. A person skilled in the art will expediently also consider the features individually and put them together to form meaningful further combinations.

In the drawing.

DETAILED DESCRIPTION

Figure 1:
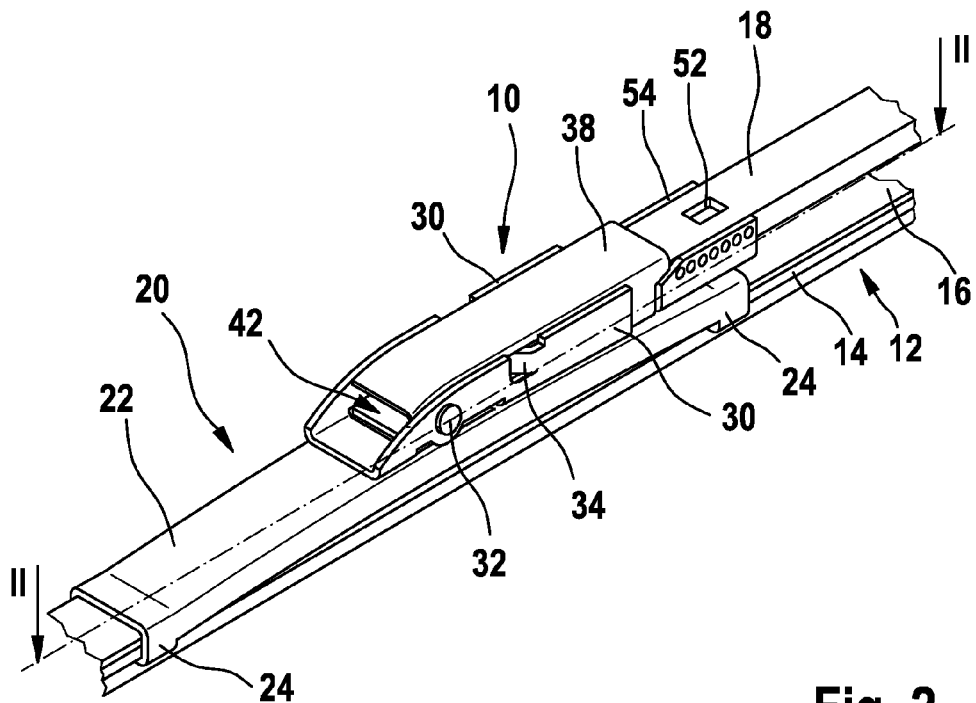
FIG. 1 shows a perspective partial view of a wiper blade with a device according to the invention.
Figure 2:
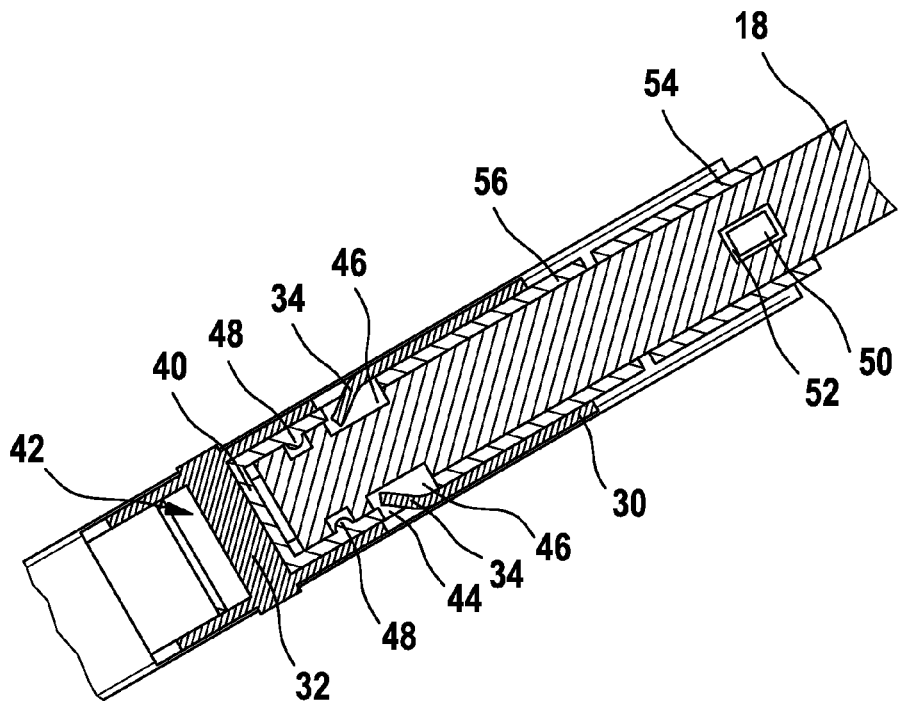
FIG. 2 shows a section corresponding to the line II-II in FIG. 1.
Figure 3:
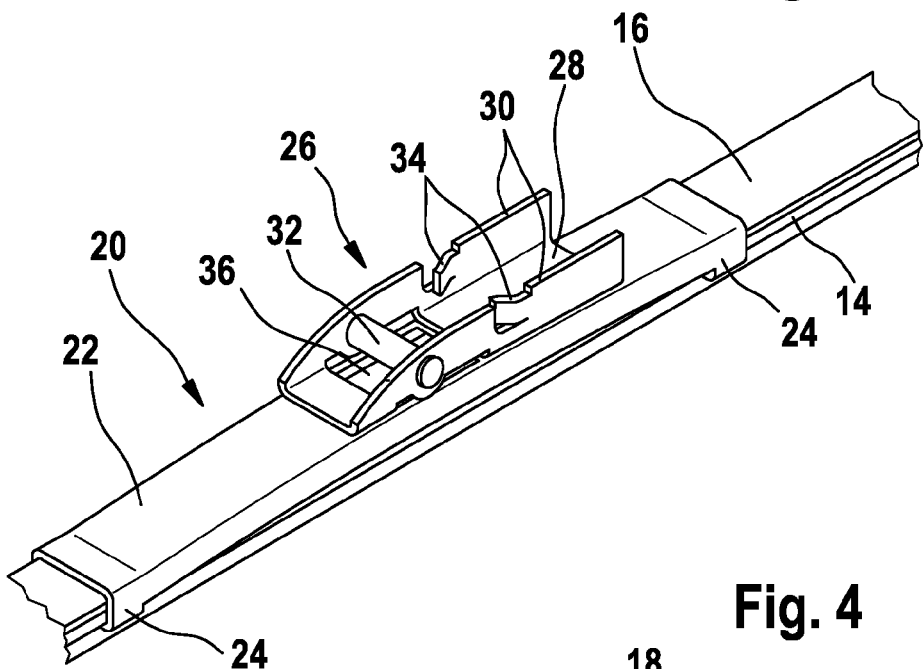
FIG. 3 shows a perspective partial view of a wiper blade with a joining element.
Figure 4:
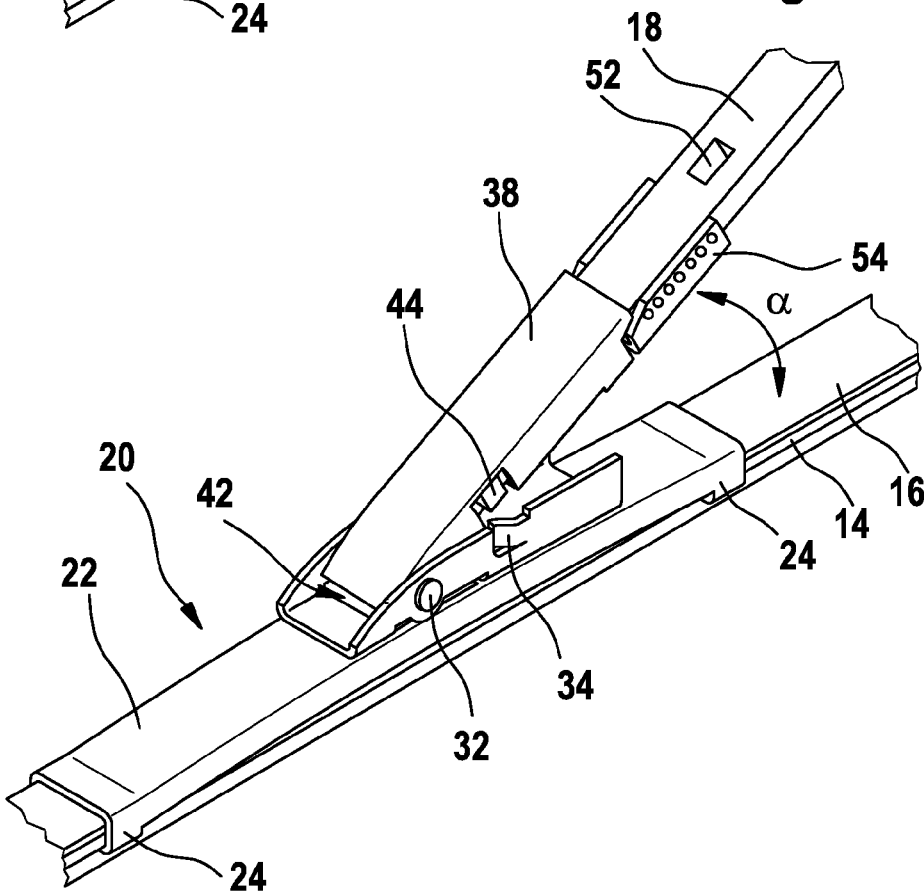
FIG. 4 shows a perspective partial view of a wiper blade with a wiper arm partially folded down.

A wiper blade 12 has a wiper strip 14 with a spring rail 16 as a supporting element to which a joining element 20 is fastened. The supporting element may also consist of two spring rails 16 which are placed into lateral longitudinal grooves in the wiper strip 14.

The joining element 20 has a fastening body 22, the claws 24 of which enclose the spring rail 16. A joint body 26 is connected fixedly to the fastening body 22, said joint body having a base 28, on the longitudinal sides of which walls 30 are provided, the side walls together with the base 28 forming a U-shaped cross-sectional profile which is open toward a wiper arm 18. The fastening body 22 and/or the joint body 26 can be produced from plastic as injection molded parts. They are expediently manufactured in the form of sheet-metal bent parts as "sheet-metal claws". Toward the free end of the wiper blade 12, the side walls 30 bear a joint pin 32 which forms the one joint part of the joint between the wiper arm 18 and the wiper blade 12 while the other joint part is formed by an open hub 40 which is located on a connecting element 38 and the hub opening 42 in which faces the free end of the wiper blade 12 in the operating position of the wiper blade 12. In the region of the joint pin 32, a cutout 36 is provided in the base 28 of the joining element 28 in order to ensure a sufficient clearance for the pivoting movement of the open hub 40 in a flat construction.

The connecting element 38, which together with the joining element 20 forms the device 10 according to the invention, can be connected fixedly to the wiper arm 18 which projects into the hollow profile of the connecting element 38 and is locked there to the connecting element 38 by means of latching studs 48 or a latching lug 50 by said latching studs or latching lug latching into corresponding latching holes 52 in the wiper arm 18. Another possibility involves a guide 54 of the connecting element 38 being crimped to the wiper arm 18.

The wiper blade 12 is connected in an articulated manner to the wiper arm 18 by the joint pin 32 being introduced into the open hub 40 if the wiper blade 12 has previously assumed an installation position relative to the wiper arm 18, said installation position running at a relatively large angle α with respect to the wiper arm 18. The wiper blade 12 is then brought into the operating position thereof, in which the wiper blade 12 runs approximately parallel to the wiper arm 18 or at a shallow angle α. So that the wiper blade 12 cannot be unintentionally detached from the wiper arm 18 through the hub opening 42 in the operating position, the side walls 30 of the joint body 26 of the joining element 20 have projections in the form of tabs 34, which are cut free from the side walls 30 and are bent toward the connecting element 38. In the operating position, said tabs engage there in corresponding cutouts 44 in the connecting element 38, which cutouts are made deeper by pockets 46 of the wiper arm 18, such that the open hub 40 is secured on the joint pin 32 in the operating position. The securing is necessary only in the operating position in which the wiper arm 18 runs parallel to the wiper blade 12 or encloses a small angle α therewith. Upon installation or removal, in which the wiper blade 12 encloses a greater angle α with the wiper arm 18, the tabs 34 pass out of the region of the cutouts 44 and of the pockets 46 such that the securing is canceled and the open hub 40 can be pulled off from the joint pin 32 in the longitudinal direction of the wiper arm 18.

In the exemplary embodiment shown, the joint pin 32 is arranged on the joining element 20 and the open hub 40 is arranged on the connecting element 38. However, said positions may in principle also be interchanged. Furthermore, the side walls 30 of the joining element 20 enclose the side walls 56 of the connecting element 38. In principle, solutions are also possible in which said arrangement is reversed. Furthermore, in the exemplary embodiment illustrated, the hub opening 42 faces the free end of the wiper blade 12. However, it is also possible for the hub opening 42 of the open hub 40 to face the drive end of the wiper blade 12. A person skilled in the art can readily realize said possibilities in accordance with the requirements of the particular application.

The invention claimed is:

1. A device (10) for a jointed connection of a wiper blade (12) to a wiper arm (18), wherein a joining element (20) which is to be connected to the wiper blade (12) has a joint part (32) which forms a joint with a joint part (40) on a connecting element (38) to be connected to the wiper arm (18), and one of the joint parts (40) is a hub (40) which is open in a longitudinal direction of the joining element (20) and, in a fitted state, is supported with respect to the connecting element (38) in a direction opposed to the hub opening (42), and wherein side walls (30, 56) of the joining element (20) and of the connecting element (38) overlap, characterized in that the side walls (56) of the connecting element (38) have cutouts (44) which are open toward a wiper strip (14) and into which projections (34) on the joining element (20) enter in an operating position of the wiper blade (12) such that the joining and connecting elements (20, 38) are locked against each other in the longitudinal direction, and characterized in that the joining element (20) is designed as a sheet-metal claw and the projections are formed by tabs (34) which are cut free from the side walls (30) of the joining element (20) and are bent toward the connecting element (38) at an acute angle with respect to the side wall (30) and enter into the cutouts (44) therein.

2. The device (10) as claimed in claim 1, characterized in that the side walls (30) of the joining element (20) as one joint part bear a joint pin (32) which is arranged between an outer end of the joining element (20) and the tabs (34).

3. The device (10) as claimed in claim 2, characterized in that a cutout (36) is provided in a base (28) of the joining element (20) in the region of the joint pin (32).

4. The device (10) as claimed in claim 3, characterized in that the connecting element (38) has latching studs (48) or a latching lug (50) which can latch into corresponding latching holes (52) in the wiper arm (18).

5. The device (10) as claimed in claim 1, characterized in that the connecting element (38) has latching studs (48) or a latching lug (50) which can latch into corresponding latching holes (52) in the wiper arm (18).

6. The device (10) as claimed in claim 1, characterized in that the joining element (20) defines an upwardly-facing U-shaped profile sized to receive the connecting element (38) therein.

7. A wiper arm (18) and a device (10) for a jointed connection of a wiper blade (12) to the wiper arm (18), wherein a joining element (20) which is to be connected to the wiper blade (12) has a joint part (32) which forms a joint with a joint part (40) on a connecting element (38) to be connected to the wiper arm (18), and one of the joint parts (40) is a hub (40) which is open in a longitudinal direction of the joining element (20) and, in a fitted state, is supported with respect to the connecting element (38) in a direction opposed to the hub opening (42), and wherein side walls (30, 56) of the joining element (20) and of the connecting element (38) overlap, characterized in that the side walls (56) of the connecting element (38) have cutouts (44) which are open toward a wiper strip (14) and into which projections (34) on the joining element (20) enter in an operating position of the wiper blade (12) such that the joining and connecting elements (20, 38) are locked against each other in the longitudinal direction, characterized in that lateral pockets (46) are provided on the wiper arm (18) in the region of the cutouts (44) in the side walls (56) of the connecting element (38), and characterized in that the projections (34) extend into the lateral pocket (46).

8. The wiper arm (18) and the device (10) as claimed in claim 7, characterized in that the projections (34) at bent at an acute angle with respect to the connecting element (38).

9. The wiper arm (18) and the device (10) as claimed in claim 7, characterized in that the joining element (20) defines an upwardly-facing U-shaped profile sized to receive the connecting element (38) therein.

10. A wiper blade (12) comprising a device (10) for a jointed connection of the wiper blade (12) to a wiper arm (18), wherein a joining element (20) connected to the wiper blade (12) has a joint part (32) which forms a joint with a joint part (40) on a connecting element (38) to be connected to the wiper arm (18), and one of the joint parts (40) is a hub (40) which is open in a longitudinal direction of the joining element (20) and, in a fitted state, is supported with respect to the connecting element (38) in a direction opposed to the hub opening (42), and wherein side walls (30, 56) of the joining element (20) and of the connecting element (38) overlap, characterized in that the side walls (56) of the connecting element (38) have cutouts (44) which are open toward a wiper strip (14) and into which projections (34) on the joining element (20) enter in an operating position of the wiper blade (12) such that the joining and connecting elements (20, 38) are locked against each other in the longitudinal direction, the projections are formed by tabs (34) which have free ends and which are cut free from the side walls (30) of the joining element (20), characterized in that the joining element (20) defines an upwardly-facing U-shaped profile sized to receive the connecting element (38) therein, and characterized in that the sidewalls (56) of the connecting element (38) are positioned between the sidewalls (30) of the joining element (20).

11. The wiper blade (12) as claimed in claim 10, characterized in that the joining element (20) is designed as a sheet-metal claw and the tabs (34) are bent toward the connecting element (38) and enter into the cutouts (44) therein.

12. The wiper blade (12) as claimed in claim 10, characterized in that the side walls (30) of the joining element (20) as one joint part bear a joint pin (32) which is arranged between the outer end of the joining element (20) and the tabs (34).

13. The wiper blade (12) as claimed in claim 10, characterized in that a cutout (36) is provided in the base (28) of the joining element (20) in the region of the joint pin (32).

14. The wiper blade (12) as claimed in claim 10, characterized in that the connecting element (38) has latching studs (48) or a latching lug (50) which can latch into corresponding latching holes (52) in the wiper arm (18).

15. The wiper blade (12) as claimed in claim 10, characterized in that the tabs (34) are bent at an acute angle toward the connecting element (38) and enter into the cutouts (44) therein.

\* \* \* \* \*

UNITED STATES PATENT AND TRADEMARK OFFICE
CERTIFICATE OF CORRECTION

PATENT NO.      : 8,448,290 B2  Page 1 of 1
APPLICATION NO. : 12/867284
DATED           : May 28, 2013
INVENTOR(S)     : Op't Roodt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 251 days.

Signed and Sealed this
Eighth Day of September, 2015

Michelle K. Lee
*Director of the United States Patent and Trademark Office*